United States Patent [19]

Fujishima

[11] Patent Number: 5,218,180

[45] Date of Patent: Jun. 8, 1993

[54] ANTI--DROSS-ATTACHMENT AGENT APPLICATION APPARATUS FOR PLASMA CUTTING

[75] Inventor: Narumi Fujishima, Hiratsuka, Japan

[73] Assignee: Kabushiki Kaisha Komatsu Seisakusho, Tokyo, Japan

[21] Appl. No.: 635,518

[22] PCT Filed: Jun. 14, 1990

[86] PCT No.: PCT/JP90/00775

§ 371 Date: Feb. 5, 1991

§ 102(e) Date: Feb. 5, 1991

[87] PCT Pub. No.: WO90/15688

PCT Pub. Date: Dec. 27, 1990

[30] Foreign Application Priority Data

Jun. 15, 1989 [JP] Japan .............................. 1-69955[U]
Jun. 15, 1989 [JP] Japan .............................. 1-69956[U]

[51] Int. Cl.⁵ .............................................. B23K 9/00
[52] U.S. Cl. ............................ 219/121.48; 219/121.39; 219/121.44; 219/121.54
[58] Field of Search .................... 219/121.39, 121.44, 219/121.48, 121.49, 121.52, 121.54, 75, 121.67, 121.72

[56] References Cited

U.S. PATENT DOCUMENTS 3,967,090  6/1976  Hamasaki et al. ............... 219/121.5
4,063,059  12/1977  Brolund et al. ................. 219/121.39
5,073,694  12/1991  Tessier et al. ................... 219/121.7

FOREIGN PATENT DOCUMENTS 54-114457  9/1979  Japan .
9009860  7/1990  World Int. Prop. O. .

Primary Examiner—Mark H. Paschall
Attorney, Agent, or Firm—Richards, Medlock & Andrews

[57] ABSTRACT

An anti-dross-attachment agent application apparatus for plasma cutting, suitable for effecting a piercing start on a member to be cut, and designed to unman or automatize the plasma cutting operation. An anti-dross-attachment agent jetting nozzle (4) and a pump (7) capable of moving together with a plasma torch (1) of a plasma cutting machine are attached to a reciprocating base (2) on which the plasma torch is mounted. The apparatus has a piping (8) for supplying compressed air to the nozzle, an electromagnetic valve (9) for opening/closing the pipe passage thereof, and a controller (11) for controlling the operations of the pump and the electromagnetic valve. The arrangement may alternatively be such that an anti-dross-attachment agent spray can (34), an actuator (39) for depressing a valve of this spray can, and a nozzle tube (36) are attached to a reciprocating base on which said plasma torch is mounted, and that a controller (11) for controlling the operation of the actuator is provided.

15 Claims, 3 Drawing Sheets

— 5,218,180 —

ANTI--DROSS-ATTACHMENT AGENT APPLICATION APPARATUS FOR PLASMA CUTTING

TECHNICAL FIELD

This invention relates to an anti-dross-attachment agent application apparatus for use with a plasma cutting machine and, more particularly, to a plasma cutting anti-dross-attachment application apparatus suitable for effecting a piercing start on a member to be cut.

BACKGROUND ART

Generally, there are two methods for cutting a steel plate into various shapes: one in which cutting is started from an end of the steel plate, and one in which cutting is started from a desired position in the steel plate surface. The latter is a piercing start method in which a through hole is formed in the steel plate at a predetermined position, and in which cutting is started from this through hole (which operation will hereinafter be referred to as "piercing start"). By piercing start, a desired shape in the steel plate surface can be cut out, and plasma cutting is, of course, based on the above two methods.

In the case of cutting a steel plate with a plasma cutting machine by effecting a piercing start, the cut material melted by the plasma torch is blown onto a hole edge portion, attaches to the same, and is further accumulated as a dross. This dross may interfere with the extreme end of the plasma torch to damage the same when the plasma torch is moved, or the melt blown and raised may be attached to the extreme end of the plasma torch so that the plasma jetting is obstructed or that a double arc is caused, resulting in a reduction in cutting quality. Conventionally, therefore, piercing is performed while the plasma torch is being held in a position such as to be free from the influence of the dross, and cutting is thereafter performed by gradually moving the plasma torch downward to a predetermined position. In this method, however, chips formed by cutting the steel plate are increased. For this reason, a method of previously applying an anti-dross-attachment agent to a piercing start portion of the steel plate has recently been studied.

Ordinarily, an anti-dross-attachment agent is a liquid having very small graphite grains as a main component. Such an anti-dross-attachment agent is applied by a method of manually applying or spraying the anti-dross-attachment agent, a method of mounting an anti-dross-attachment agent application apparatus on the plasma cutting machine, or other methods. In the case of manual application of an anti-dross-attachment agent, however, it is difficult to uniformly apply the agent, and the application operation is obstructive to the promotion of unmanning or automatization of the plasma cutting operation. In addition, there is no anti-dross-attachment agent application apparatus satisfactory in terms of unmanning or automatizing the plasma cutting operation.

In view of the above-described problems of the conventional methods or apparatus, an object of the present invention is to provide an anti-dross-attachment agent application apparatus for plasma cutting satisfactory in terms of unmanning or automatizing the plasma cutting operation.

DISCLOSURE OF INVENTION

In an arrangement of the present invention, an anti-dross-attachment agent jetting nozzle capable of moving together with a plasma torch of a plasma cutting machine, a tank containing an anti-dross-attachment agent, a piping and a pump for supplying the anti-dross-attachment agent from the tank to the nozzle are attached to a reciprocating table on which the plasma torch is mounted, and there are provided a piping for supplying compressed air to the nozzle, an electromagnetic valve for opening/closing the pipe passage thereof, and a controller for controlling the operations of the pump and the electromagnetic valve.

In another arrangement of the present invention, an anti-dross-attachment agent spray can capable of moving together with a plasma torch of a plasma cutting machine, an actuator for depressing a valve of the spray can, and a nozzle tube for jetting an anti-dross-attachment agent from the spray can to a member to be cut are attached to a reciprocating table on which the plasma torch is mounted, and a controller for controlling the operation of the actuator is provided.

In accordance with these arrangements, the apparatus is provided which sprays the anti-dross-attachment agent to a piercing portion of the member to be cut under the control of the controller, thereby making it possible to spray the anti-dross-attachment agent without any manual operation. Because an anti-dross-attachment agent contained in a spray can is used, the anti-dross-attachment agent can be resupplied only by changing the spray can. According to the present invention, a cut material melt blown and raised at the time of piercing is blown away by the plasma gas and cannot easily be attached to or accumulated on a hole edge portion, thereby preventing damage of the plasma torch tip, plasma jetting failure, occurrence of a double arc and so on.

BEST MODE FOR CARRYING OUT THE INVENTION

Anti-dross-attachment agent application apparatuses for plasma cutting in accordance with embodiments of the present invention will be described below in detail with reference to the accompanying drawings.

Figure 1:
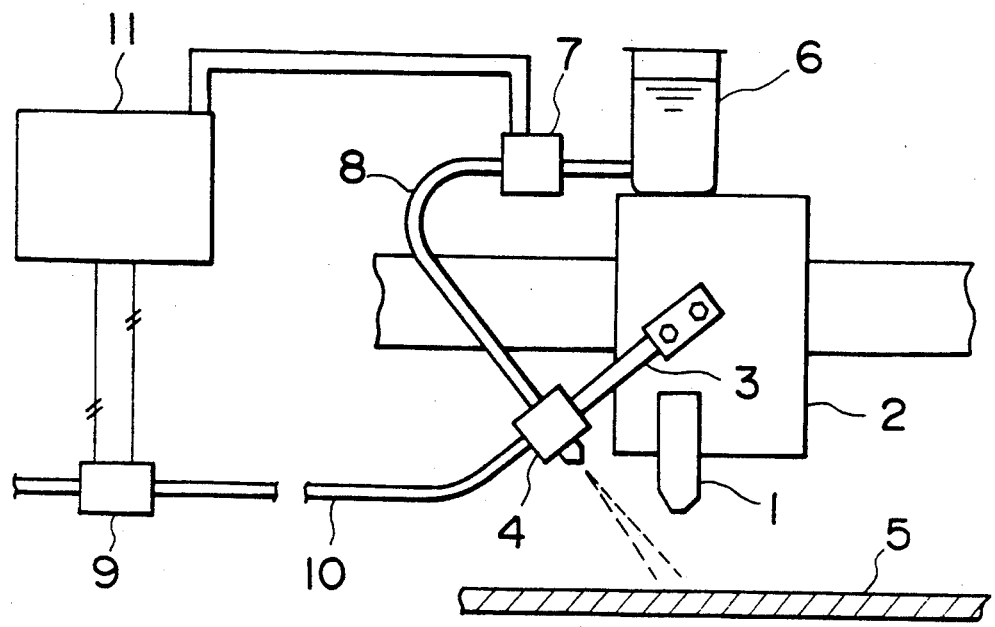
FIG. 1 is a schematic diagram of the construction of an anti-dross-attachment agent application apparatus for plasma cutting in accordance with a first embodiment of the present invention.

FIG. 1 is a schematic diagram of the construction of a first embodiment of the present invention in which an anti-dross-attachment agent application apparatus for plasma cutting in accordance with the present invention is attached to a plasma cutting machine in which a plasma cutter is mounted on an X-Y table. A plasma torch 1 is mounted on a reciprocating base 2 which can be moved freely to any position on the X-Y table, and a nozzle 4 is fixed on the reciprocating base 2 with a nozzle fixing bracket 3 interposed therebetween. To maintain the anti-dross-attachment agent spraying distance in a suitable range, the tip of the nozzle 4 is positioned obliquely above the tip of the plasma torch 1 and is fixed at an angle such that when an anti-dross-attachment agent is sprayed to a member 5 which is to be cut, the center of the coating of the anti-dross-attachment agent coincides generally with the center line of the plasma torch 1.

A tank 6 which contains the anti-dross-attachment agent is fixed on the reciprocating base 2, and a hose 8 for supplying the anti-dross-attachment agent from the tank 6 through a pump 7 is connected to the nozzle 4. An electromagnetic valve 9 for opening/closing a compressed air circuit for jetting the anti-dross-attachment agent is provided in an intermediate portion of the compressed air circuit, and a compressed air hose 10 is connected to the nozzle 4. A wiring for the electromagnetic valve 9 is connected to a controller 11 of the plasma cutting anti-dross-agent applying apparatus. The controller 11 operates by being linked to the movement of the reciprocating base 2.

The operation of this apparatus is as described below. The reciprocating base 2 on which the plasma torch 1 is mounted is moved over the member 5 to be cut so that the center of the plasma torch 1 coincides with the piercing start position. Then the controller 11 makes the pump 7 and the electromagnetic valve 9 start operating. The pump 7 supplies the anti-dross-attachment agent in the tank 6 to the nozzle 4, and the electromagnetic valve 9 opens the compressed air circuit to supply compressed air to the nozzle 4. The compressed air opens a valve in the nozzle 4 to spray the member 5 to be cut with the anti-dross-attachment agent at a position right below the plasma torch 1. In this case, the shape of the anti-dross-attachment agent coating is generally elliptical. Next, the operation of the pump 7 is stopped and the electromagnetic valve 9 is closed. Spraying the anti-dross-attachment agent is thereby stopped. After the piercing start portion has been coated with the anti-dross-attachment agent in this manner, a piercing start of the plasma torch is effected.

This sequence of operation is repeatedly executed each time a piercing start is performed. However, since it is automatically performed under the control of the controller, there is no need for any manual operation except for inputting the control program into the controller.

Figure 2:
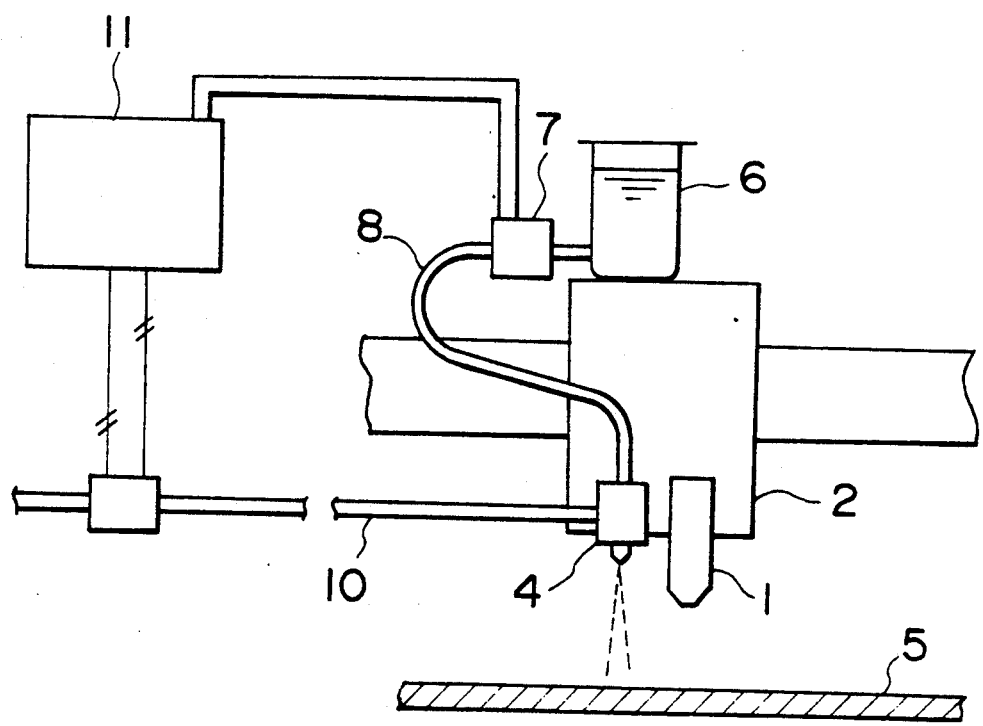
FIG. 2 is a diagram of the construction of an example of an application of the first embodiment.

FIG. 2 shows an example of an application of the first embodiment of the present invention. The nozzle 4 is fixed to the reciprocating base 2 parallel to the plasma torch 1. In this case also, the tip of the nozzle 4 is fixed in a position such as to be located obliquely above the tip of the plasma torch 1.

This apparatus sprays the anti-dross-attachment agent based on the control of the controller 11. After the spraying has been completed, the plasma torch 1 is translated with respect to the center of the coating formed by spraying, and a piercing start is thereafter effected.

The anti-dross-attachment agent is sprayed perpendicularly to the member 5 to be cut, and the shape of the coating is therefore approximate to a perfect circle.

Figure 3:
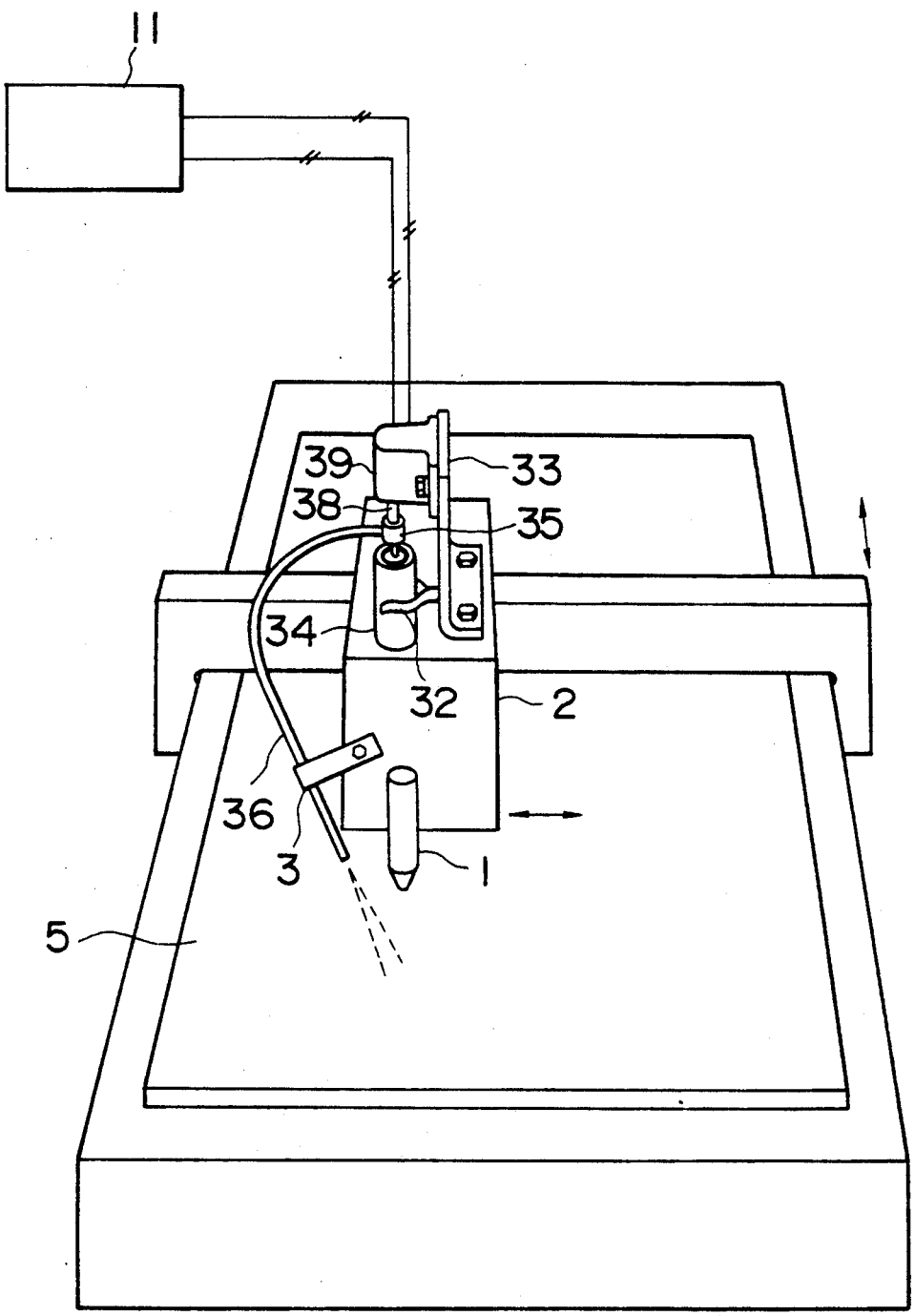
FIG. 3 is a schematic perspective view of a second embodiment of the present invention.

FIG. 3 is a schematic perspective view of a second embodiment of the present invention. Members identical to those shown in FIG. 1 are indicated by the same reference characters and the description for them will not be repeated. A plasma torch 1 is mounted on a reciprocating base 2 which can be moved freely to any position on the X-Y table, and an actuator 39 is fixed on an upper surface of the reciprocating base 2 with a bracket 33 interposed therebetween. The actuator 39 comprises an electromagnetic valve, and has a push pin 38 projecting from its lower surface. The push pin 38 is close to a valve 35 which is an upper portion of an anti-dross-attachment agent spray can 34 on the market. The spray can 34 is fixed below the actuator 33 by a clip 32. One end of a nozzle tube 36 is connected to an anti-dross-attachment agent jetting port of the spray can 34. To maintain the anti-dross-attachment agent spraying distance in a suitable range, the other end of the nozzle tube 36 is positioned obliquely above the tip of the plasma torch 1 and is fixed by a bracket 3 on the reciprocating base 2 at an angle such that when an anti-dross-attachment agent is sprayed to a member 5 which is to be cut, the center of the coating of the anti-dross-attachment agent coincides generally with the center line of the plasma torch 1.

The operation of this apparatus is as described below. The reciprocating base 2 on which the plasma torch 1 is mounted is moved over the member 5 to be cut so that the center of the plasma torch 1 coincides with the piercing start position. Then the controller 11 energizes the electromagnetic valve 39 so that the push pin 38 of this valve depresses the valve 35 on the anti-dross-attachment agent spray can 34. The anti-dross-attachment agent thereby jetted from the spray can 34 is supplied through the nozzle tube 36 and is jetted from the lower end thereof, thereby being sprayed to a position on the member 5 to be cut right below the plasma torch 1. After the spraying of the anti-dross-attachment agent has been completed, the electromagnetic valve 39 is de-energized, the push pin 38 is returned upward, and the valve 35 of the spray can 34 is closed, thereby stopping jetting the anti-dross-attachment agent. After the piercing start portion has been coated with anti-dross-attachment agent in this manner, a piercing start of the plasma torch 1 is effected. The sequence of operation related to the application of the anti-dross-attachment agent described above is repeatedly executed each time a piercing start is performed. However, since it is automatically performed under the control of the controller, there is no need for any manual operation.

Figure 4:
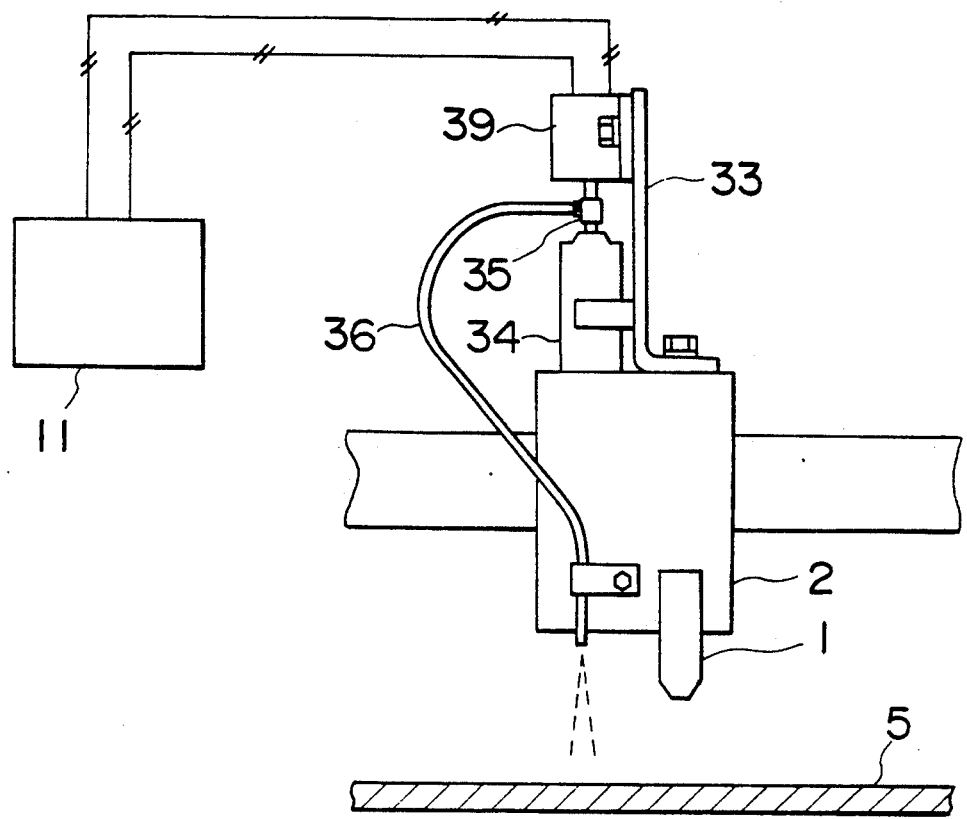
FIG. 4 is a diagram of the construction of an example of an application of the second embodiment.

FIG. 4 shows an example of an application of the second embodiment of the present invention. The lower end of the nozzle tube 36 is fixed to the reciprocating base 2 parallel to the plasma torch 1. In this case also, the tip of the nozzle tube 36 is fixed in a position such as to be located obliquely above the tip of the plasma torch 1. This apparatus sprays the anti-dross-attachment agent based on the control of the controller 11. After the spraying has been completed, the plasma torch 1 is translated with respect to the center of the coating formed by spraying, and a piercing start is thereafter effected.

In each of the above-described embodiments, the anti-dross-attachment agent application apparatus is attached to a plasma cutting machine in which a plasma cutter is mounted on an X-Y table. However, the present invention is not limited to this. Even in the case of a plasma cutting machine in which a plasma cutter is mounted on a robot or the like, the anti-dross-attachment agent application apparatus may be attached in the vicinity of the plasma torch to obtain the same effects as the plasma cutting machine in which a plasma cutter is mounted on an X-Y table. An axially moving motor, a pneumatic cylinder, or the like may be used in place of the electromagnetic valve to open/close the valve of the anti-dross-attachment agent spray can. Also, the control portion of the anti-dross-attachment agent application apparatus may be constructed integrally with the plasma torch operation controller, and the anti-dross-attachment agent can be applied to a desired portion other than the piercing position by changing the control program.

INDUSTRIAL APPLICABILITY

The present invention is effective as a plasma anti-dross-attachment agent application apparatus satisfactory in terms of unmanning or automatizing the plasma cutting operation, and as an anti-dross-attachment agent application apparatus which is reduced in price and which can be easily utilized.

What is claimed is:

1. An anti-dross-attachment agent application apparatus for plasma cutting characterized in that an anti-dross-attachment agent jetting nozzle capable of moving together with a plasma torch of a plasma cutting machine, a tank containing an anti-dross-attachment agent, a first piping and a pump for supplying the anti-dross-attachment agent from said tank to said nozzle are attached to a reciprocating base on which said plasma torch is mounted, and in comprising a second piping for supplying compressed air to said nozzle, an electromagnetic valve for opening and closing the pipe passage of said second piping, and a controller for controlling the operations of said pump and said electromagnetic valve.

2. Apparatus in accordance with claim 1 wherein the operation of said controller is linked to the movement of the reciprocating base with respect to a member to be cut.

3. Apparatus in accordance with claim 2 wherein the nozzle is positioned on said reciprocating base at an angle such that the center of the resulting coating of the anti-dross-attachment agent on said member coincides generally with the centerline of the plasma torch.

4. Apparatus in accordance with claim 2 wherein the nozzle is positioned on said reciprocating base parallel to said plasma torch; and wherein said controller provides for the positioning of the nozzle above a portion of said member at which a piercing start of the plasma torch is to be effected, for the spraying of said anti-dross-attachment agent from said nozzle onto said portion to form a coating thereon, for the termination of the spraying of said anti-dross-attachment agent onto said portion, for the repositioning of said reciprocating base so that the plasma torch is translated with respect to the center of the coating, and for the effecting of a piercing start by the thus translated plasma torch at the thus coated portion.

5. An anti-dross-attachment agent application apparatus for plasma cutting characterized in that an anti-dross-attachment agent spray can capable of moving together with a plasma torch of a plasma cutting machine, an actuator for depressing a valve of said spray can, and a nozzle tube for jetting an anti-dross-attachment agent from said spray can to a member to be cut are attached to a reciprocating base on which said plasma torch is mounted, and in comprising a controller for controlling the operation of said actuator.

6. Apparatus in accordance with claim 5 wherein the operation of said controller is linked to the movement of the reciprocating base with respect to said member to be cut.

7. Apparatus in accordance with claim 6 wherein the nozzle tube is positioned on said reciprocating base at an angle such that the center of the resulting coating of the anti-dross-attachment agent on said member coincides generally with the centerline of the plasma torch.

8. Apparatus in accordance with claim 6 wherein the nozzle tube is positioned on said reciprocating base parallel to said plasma torch; and wherein said controller provides for the positioning of the nozzle tube above a portion of said member at which a piercing start of the plasma torch is to be effected, for the spraying of said anti-dross-attachment agent from said nozzle tube onto said portion to form a coating thereon, for the termination of the spraying of said anti-dross-attachment agent onto said portion, for the repositioning of said reciprocating base so that the plasma torch is translated with respect to the center of the coating, and for the effecting of a piercing start by the thus translated plasma torch at the thus coated portion.

9. An automated method of cutting a member with a plasma cutter utilizing a piercing start, which comprises the steps of:
    moving a reciprocating base, on which a plasma torch and a means for spraying anti-dross-attachment agent are mounted, over the member to be cut so that the spray pattern of said anti-dross-attachment agent from said means for spraying coincides with the piercing start position on said member;
    utilizing a controller, which operates by being linked to the movement of the reciprocating base, to automatically cause said means for spraying to initiate the spraying of said anti-dross-attachment agent onto said member at said piercing start position to provide a coating of said anti-dross-attachment agent at said piercing start position on said member and then to automatically terminate the spraying of said anti-dross-attachment agent;
    positioning said plasma torch so that the center of the plasma torch coincides with the piercing start position on said member; and
    effecting a piercing start of the plasma torch to cut a hole through said member at the thus coated piercing start position.

10. Apparatus in accordance with claim 9 wherein said means for spraying comprising a nozzle, a source of anti-dross-attachment agent and a piping containing an electromagnetic valve for supplying said anti-dross-attachment agent from said source through said valve to said nozzle, and wherein the step of utilizing a controller comprises employing said controller to automatically open said valve when said nozzle is positioned to spray said anti-dross-attachment agent onto said piercing start position on said member and then to automatically close said valve after the completion of said coating.

11. Apparatus in accordance with claim 9 further comprising automatically repeating said steps to effect a piercing start of the plasma torch at another location on said member.

12. Apparatus in accordance with claim 9 wherein said plasma torch is positioned so that the center of the plasma torch coincides with the piercing start position on said member during the automatic application of said coating of said anti-dross-attachment agent at said piercing start position on said member.

13. Apparatus in accordance with claim 12 wherein the shape of said coating is generally elliptical.

14. Apparatus in accordance with claim 9 wherein after the completion of the automatic application of said coating of said anti-dross-attachment agent at said piercing start position on said member, said reciprocating base is repositioned so that the center of the plasma torch coincides with the piercing start position on said member.

15. Apparatus in accordance with claim 14 wherein the shape of said coating is circular.

* * * * *

UNITED STATES PATENT AND TRADEMARK OFFICE
CERTIFICATE OF CORRECTION

PATENT NO.  :   5,218,180
DATED       :   June 8, 1993
INVENTOR(S) :   Narumi FUJISHIMA It is certified that error appears in the above-identified patent and that said Letters Patent is hereby corrected as shown below:

Column 6, line 43, change "Apparatus" to --A method--.

Column 6, line 55, change "Apparatus" to --A method--.

Column 6, line 59, change "Apparatus" to --A method--.

Column 6, line 65, change "Apparatus" to --A method--.

Column 6, line 67, change "Apparatus" to --A method--.

Column 8, line 3, change "Apparatus" to --A method--.

Signed and Sealed this

Eighth Day of March, 1994

*Attest:*

BRUCE LEHMAN

*Attesting Officer*          *Commissioner of Patents and Trademarks*